United States Patent
Kennedy et al.

(10) Patent No.: US 8,389,947 B2
(45) Date of Patent: Mar. 5, 2013

(54) METHOD AND SYSTEM FOR DETECTING NEUTRON RADIATION

(75) Inventors: Adam M. Kennedy, Santa Barbara, CA (US); David R. Rhiger, Santa Barbara, CA (US); Stefan T. A. Baur, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 21 days.

(21) Appl. No.: 13/169,389

(22) Filed: Jun. 27, 2011

(65) Prior Publication Data

US 2012/0326047 A1    Dec. 27, 2012

(51) Int. Cl.
*G01T 3/00* (2006.01)

(52) U.S. Cl. ......... 250/390.01; 250/339.04; 250/370.05; 250/390.03

(58) Field of Classification Search ............... 250/390.01
See application file for complete search history.

(56) References Cited

U.S. PATENT DOCUMENTS

| | | | |
|---|---|---|---|
| 5,578,830 A | 11/1996 | Olsher et al. | |
| 6,144,030 A | 11/2000 | Ray et al. | |
| 6,229,144 B1 | 5/2001 | Ouvrier-Buffet et al. | |
| 7,030,379 B2 * | 4/2006 | Katagiri et al. | 250/336.2 |
| 7,141,804 B1 | 11/2006 | Akselrod et al. | |
| 2003/0001094 A1 | 1/2003 | Katagiri et al. | |
| 2005/0205786 A1 | 9/2005 | Katagiri et al. | |
| 2005/0258372 A1 * | 11/2005 | McGregor et al. | 250/390.01 |
| 2011/0049379 A1 * | 3/2011 | Moses | 250/390.01 |

OTHER PUBLICATIONS

Silver et al., "Optimization of a 6LiF Bolometric Neutron Detector," Nuclear Instruments and Methods in Physics Research A 485 (2002), 615-123.
Rhiger et al., U.S. Appl. No. 12/455,383, "Neutron Detection System" filed Jun. 1, 2009.

* cited by examiner

*Primary Examiner* — Marcus Taningco
(74) *Attorney, Agent, or Firm* — Cantor Colburn LLP

(57) ABSTRACT

A method for detecting neutron radiation in accordance with particular embodiments includes exposing a neutron detector array comprising at least one two-dimensional array of neutron detectors to a first scene of interest. The neutron detector array is based on at least one two-dimensional array of microbolometer detectors. The method also includes receiving a plurality of response values from a corresponding plurality of neutron detectors of the neutron detector array. The method further includes generating a comparison value based on the plurality of response values and a baseline response value. The method additionally, includes determining whether more than a first threshold amount of neutron radiation is being generated by the first scene based on the comparison value.

22 Claims, 4 Drawing Sheets

METHOD AND SYSTEM FOR DETECTING NEUTRON RADIATION

TECHNICAL FIELD OF THE INVENTION

This invention relates in general to methods and systems for detecting neutrons.

BACKGROUND

Neutron detectors may be used to monitor radioactive sources that emit neutrons. They may be used for medical imaging, neutron radiography, high resolution images and for detecting radioactive materials that may be hidden from sight (e.g., being smuggled through a security checkpoint).

One conventional neutron detector system utilizes a device known as a Schottky barrier. The Schottky barrier includes a metal layer on a gallium arsenide (GaAs) semiconductor material and a neutron sensitive surface layer, such as $^{10}B$. A negative voltage applied at a first metal contact sets up the Schottky barrier. The combination of the negative voltage at the first metal contact and positive voltage applied at a second metal contact creates an electric field in the GaAs material which results in an active GaAs region. Incident neutrons react with neutron absorbing atoms in the neutron sensitive surface layer (e.g., $^{10}B$) to form energetic particles (e.g., alpha ($^4He$) and $^7Li$). One of the charged particles from the reaction will penetrate through the neutron sensitive surface layer and the Schottky barrier and enter the active region of the GaAs semiconductor. In the active GaAs active region, the energetic particle gives up some of its energy to form electron hole pairs. These charged carriers (the electrons and the holes) then move in the electric field and create a current pulse which appears in an external circuit to provide for detection of neutrons.

Another conventional neutron detector system utilizes a microchannel plate made of glass doped with $^{10}B$. The microchannels are aligned normal to the surface of the plate and include a high resistance material. A high voltage is applied between the two faces of the plate. Incoming neutrons react with the $^{10}B$ in the solid bulk of glass of the plate and generate energetic particles. The energetic particles travel through the bulk of the solid glass and hit the lining of various microchannels to generate electrons. The electrons emitted from the wall of each microchannel then hit the opposite walls of that channel to generate more electrons, which similarly hit opposite walls, and so forth, resulting in an avalanche of electrons in that microchannel. The avalanche of electrons emitted from various microchannels is each detected as a pulse by a detector, such as a cross-finger anode board. This provides information as to where and when the pulse emitted from the microchannel plate to provide for detection of neutrons.

SUMMARY

From the foregoing, it may be appreciated that a need has arisen for a method for detecting neutron radiation that includes exposing a neutron detector array comprising at least one two-dimensional array of neutron detectors to a first scene of interest. The neutron detector array is based on at least one two-dimensional array of microbolometer detectors. The method also includes receiving a plurality of response values from a corresponding plurality of neutron detectors of the neutron detector array. The method further includes generating a comparison value based on the plurality of response values and a baseline response value. The method additionally, includes determining whether more than a first threshold amount of neutron radiation is being generated by the first scene based on the comparison value.

Technical advantages of particular embodiments may include detecting neutron radiation using a compact microbolometer based design. Accordingly, neutron radiation detection may be integrated into checkpoint scanners as well as other devices or equipment having other functions (e.g., targeting equipment). Another technical advantage of particular embodiments includes providing a solid state neutron radiation detector. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

A better understanding of particular embodiments will be realized from the detailed description which follows, taken in conjunction with the accompanying drawings, in which.

DETAILED DESCRIPTION OF THE DRAWINGS

Figure 1:
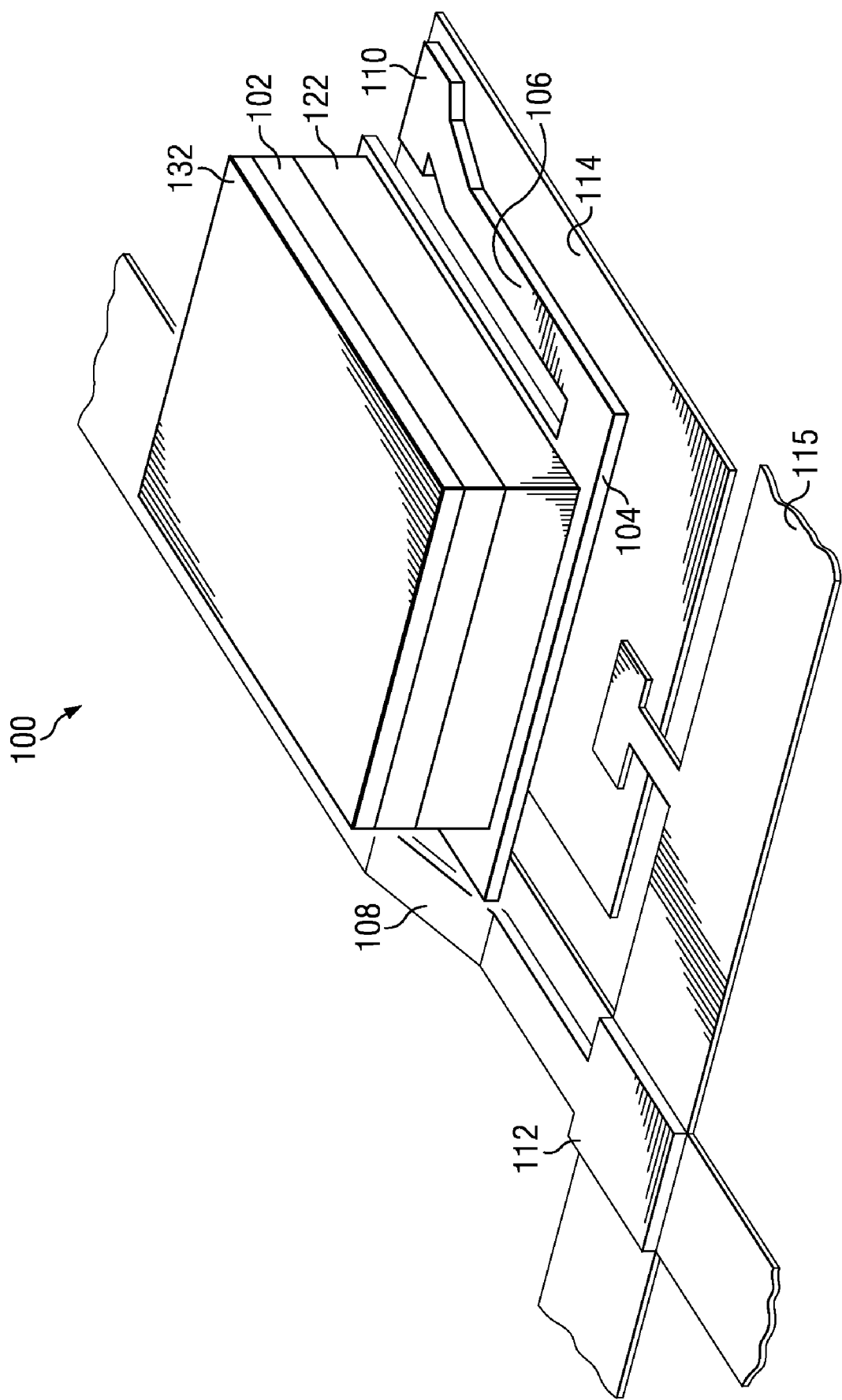
FIG. 1 is a three-dimensional perspective view of a single neutron detector in a neutron detector system, in accordance with particular embodiments.

FIG. 1 is a three-dimensional perspective view of a single neutron detector in a neutron detector system, in accordance with particular embodiments. Neutron detector 100 may be one of several neutron detectors in an array of neutron detectors of a neutron detection system. Neutron detector 100 may be substantially square with a center-to-center spacing with other neutron detectors of approximately 17, 25, or 50 µm. Neutron detector 100 may be based on a typical infrared (IR) microbolometer detector of a microbolometer detector array.

A typical IR microbolometer array includes a large number of microbolometer detectors arranged in a two-dimensional array (e.g., 640×480). Each microbolometer detector may be able to produce an electrical signal representing the incident IR flux on the respective microbolometer detector. The electrical signal is based on a change in temperature of a sensing element of the respective microbolometer detector in response to the incident IR flux.

The fabrication of neutron detector 100 may be similar in several respects to the fabrication of a typical IR microbolometer. The fabrication of neutron detector 100 may begin with the formation of readout circuitry 114 on a silicon wafer. The wafer may eventually be diced into chips (or dies), each of which consists of an array of neutron detectors 100. Above readout circuit 114 is bridge 104 which is supported by legs 106 and 108. Legs 106 and 108 may be coupled to connectors 110 and 112, respectively, which are connected to readout circuitry 114 by leads 115. Bridge 104 may hold a sensing element (not visible in FIG. 1). The sensing element may be formed with electrical and mechanical connections to the silicon. The sensing element may be responsive to changes in temperature. In operation, an increase in the temperature of the sensing element in bridge 104 reduces the resistively of the sensing element. The change in resistance of the sensing element is sensed by readout circuit 114. For example, readout circuit 114 may use a known current driven through the sensing element in bridge 104 to determine the change in resistance of the sensing element. The change in resistivity indicates a change in temperature of the sensing element.

The various materials that may be used for the sensing element may not typically be utilized to detect neutrons because the materials do not react with neutrons. However, as discussed in more detail below with respect to FIG. 2, particular embodiments may include neutron sensitive layer 102 sandwiched between particle capture layer 122 and heat barrier 132. These layers may be thermally coupled to the sensing element. In some embodiments, both particle capture layer 122 and heat barrier 132 may be made from the same material, such as gold. Heat barrier 132 may be used to block at least a portion of incident radiant heat (e.g., heat from infrared waves) from the scene being viewed by neutron detector 100. Particle capture layer 122 may be used to capture energetic particles emitted from neutron sensitive layer 102. The captured particles may originate from a reaction caused by neutrons colliding or otherwise interacting with neutron sensitive layer 102. The kinetic energy of the captured particles may create thermal energy in particle capture layer 122. This thermal energy may change the resistance of the sensing element. Readout circuit 114 then generates a response value based on the change in resistance. Readout circuit 114 for each neutron detector 100 in the array of neutron detectors may generate its own response based on the change in temperature of the respective neutron detector 100.

Unlike an IR microbolometer in which the detector is concerned with generating an image of a scene, a neutron detection system may be concerned with determining whether a threshold amount of neutron radiation is being emitted from a scene. Thus, in certain embodiments, the responses from the array of neutron detectors may be averaged to generate a frame value, rather than maintaining the individual responses from each detector of the array.

In some embodiments, the frame value may be based on adjusted response values from each neutron detector 100. For example, readout circuit 114 may compare (e.g., subtract) the raw response from the sensing element with a baseline response. The baseline response may be a predetermined threshold (e.g., based on an unacceptable level of neutron radiation), a predetermined standard value (e.g., based on a typical real world level of neutron radiation), a dynamic average value (e.g., based on previous response values from the neutron detector array), or any other suitable adjustment value. In particular embodiments, the frame value may be determined by averaging a raw response value from each neutron detector 100. The resulting average response value may be adjusted based on a comparison to a baseline response value.

Based on the comparison of the response values and the baseline value, a determination may be made as to whether the amount of neutron radiation being emitted by a scene or object is within acceptable parameters. These parameters may vary depending on the scenario in which the neutron detector is being deployed. In some embodiments, the parameters may be adjusted by a user and/or by the neutron detection system (e.g., based on previous response values). In certain embodiments, the parameters may be predetermined and programmed when the neutron detector is manufactured. If it is determined that an unacceptable amount of neutron radiation has been detected, an alarm may be triggered. The alarm may include an audible (e.g., a buzzing or beeping sound) and/or a visual alarm (e.g., a blinking light or a text based message). In particular embodiments, the alarm may contain a directional element indicating the direction of the source of the neutron radiation.

Figure 2:
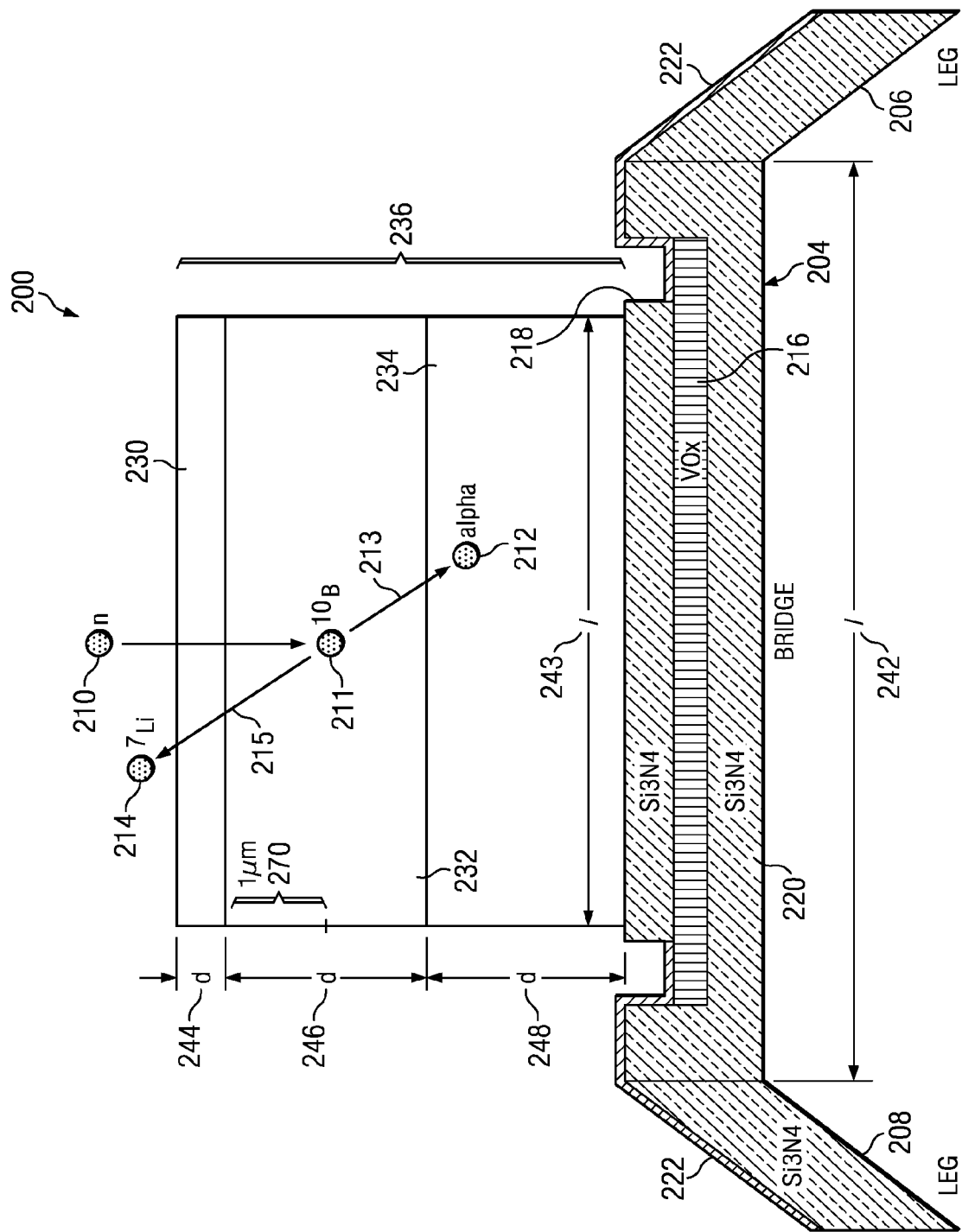
FIG. 2 is a cross-sectional view of a neutron detector, in accordance with particular embodiments.

FIG. 2 is a cross-sectional view of a neutron detector, in accordance with particular embodiments. Neutron detector 200 may be used to detect neutrons, such as neutron 210, emitted from a scene of interest. Neutron detector 200 may be one of an array of neutron detectors. Neutron detector 200 may comprise neutron sensitive layer 202 sandwiched between heat barrier 230 and particle capture layer 234. Neutron sensitive layer 202, heat barrier 230, and particle capture layer 234 are collectively referred to as neutron stack 236. Neutron stack 236 may sit atop a bridge of a microbolometer detector.

Neutron sensitive layer 232 may take advantage of a common neutron capture reaction used in neutron detection, $^{10}B(n,\alpha)^{7}Li$. This reaction may be written as:

$$^{10}B + n \rightarrow \alpha + ^{7}Li \qquad (1)$$

This reaction is convenient for neutron detection because of the relatively large cross section of $^{10}B$ for thermal neutrons and because the energies of the final particles are in a range (e.g., about 1.470 MeV for the alpha particle and about 0.840 MeV for the $^{7}Li$ particle) that is suitable for detection by a microbolometer detector. The natural isotopic abundance of $^{10}B$ is about 19.80%.

In reaction (1) above the neutron n (e.g., neutron 210) passes through heat barrier 230 and is absorbed by the $^{10}B$ nucleus of neutron sensitive layer 232. Neutron sensitive layer 232 may be made of neutron absorbing atoms, such as $^{10}B$, $^{6}Li$, or other similar types neutron capturing atoms. These materials may be insensitive to gamma radiation, thereby allowing neutron detector 200 to be relatively insensitive to gamma radiation. The reaction between neutron 210 and neutron sensitive layer 232 may create alpha particle 212 (e.g., 4He nucleus) and 7Li particle 214. Both particles may be referred to as energetic particles. The total energy released for the reaction is about 2.310 MeV (94%). Particles 212 and 214 may emerge as a pair in a random direction with each particle of the pair traveling in opposite directions, due to momentum conservation.

Particle capture layer 234 may capture the energetic particles, such as alpha particle 212, emitted from neutron sensitive layer 232. In doing so, particle capture layer 234 may convert the kinetic energy of alpha particle 212 into heat. Particle capture layer 234 may be made of gold (Au), platinum, thallium, lead, bismuth, palladium, silver, indium, tin, or any heavy element that can capture a relatively large portion of the energetic particles emitted from a neutron reaction with neutron sensitive layer 232.

Heat barrier 230 may be substantially transparent to neutrons. This may allow neutron 210 to pass through heat barrier 230 substantially unimpeded. Heat barrier 230 may help to reflect unwanted heat. For example, heat barrier 230 may help block infrared radiation. This may increase the percentage of heat in particle capture layer 234 due do alpha particle 212. Heat barrier 230 may be made of gold, platinum, silver, tin, aluminum, nickel, or any other reflective element that can reflect incident heat.

The bridge supporting neutron stack 236 comprises the sensing element responsive to the change in heat of particle capture layer 234. In some embodiments, the sensing element may comprise a thin layer of vanadium oxide (VOx), VOx layer 216, sandwiched between two silicon-nitride ($Si_3N_4$)

layers, silicon-nitride layers 218 and 220. A thin metal film 222 may be disposed on legs 206 and 208 and contacts VOx layer 216.

In certain embodiments, the combined structure of particle capture layer 234, silicon-nitride layers 218 and 220, VOx layer 216 may be thick enough to stop or capture most of the energetic particles emitted from neutron sensitive layer 232 towards particle capture layer 234. In particular embodiments, particle capture layer 234 may be thick enough to capture therein a large portion of the energetic particles (alpha particle 212 or 7Li particle 214) traveling through particle capture layer 234. This may allow for essentially all of the kinetic energy of the energetic particles to be captured and converted to heat. This may provide for a very sensitive neutron detector 200.

The thickness of neutron sensitive layer 232 may vary depending on operational needs. For example, the efficiency with which neutron sensitive layer 232 reacts with neutron 210 may increase as the thickness of neutron sensitive layer 232 increases. However, the increased mass of neutron sensitive layer 232 may increase the heat capacity of neutron detector 200. This decreases the change in temperature created by the captured energetic particles.

In some embodiments, distance 244 of heat barrier 230 may be between approximately 0.01 and 1.0 µm (e.g., approximately 0.1 µm), distance 246 of neutron sensitive layer 232 may be between approximately 0.5 and 3.0 µm (e.g., approximately 2 µm), distance 248 of particle capture layer 234 may be between approximately 0.5 and 3.0 µm (e.g., approximately 1.5 µm), silicon-nitride layers 218 and 220 may have a combined thickness of approximately between 0.1 and 2.0 µm (e.g., approximately 1.0 µm), and VOx layer 216 may be between approximately 0.01 and 0.5 µm (e.g., approximately 0.05 µm) thick.

Depending on the embodiments, length 242 of the bridge may be between approximately 10 and 50 µm (e.g., approximately 17 µm). Length 243 of neutron stack 236 may be between approximately 8 and 45 µm (e.g., approximately 14 µm). In certain embodiments, length 243 may be approximately 80% of length 242.

In operation, neutron 210 collides with a neutron absorbing atom 211 (e.g., $^{10}$B) in neutron sensitive layer 232, the resulting reaction produces two energetic particles, alpha particle 212 and $^{7}$Li particle 214, that travel in random but opposite directions. Most of the time, at least one of the energetic particles of the reaction will travel along a path that intersects particle capture layer 234. Particle capture layer 234 may capture, or stop, most of the energetic particles that enter it. The kinetic energy of the captured particles is converted to heat. The converted heat raises the temperature of particle capture layer 234 which in turn raises the heat of VOx layer 216. The increase in heat in VOx layer 216 reduces the resistance of VOx layer 216. This change in resistance may be detected by the readout circuitry in a similar manner as a typical IR microbolometer detector.

Although FIG. 2 depicts alpha particle 212 being emitted into particle capture layer 234, this was done for illustration purposes only, as the $^{7}$Li energetic particles may just as likely enter particle capture layer 234 as discussed above.

In some embodiments, legs 206 and 208 may be made thinner than a typical IR microbolometer to provide a longer thermal time constant. In certain embodiments, the readout circuitry may be modified from a typical IR microbolometer to sacrifice some dynamic range for increased sensitivity.

Although neutron detector 100 has been described using a neutron sensitive layer 232 that is responsive to neutrons having a relatively low kinetic energy (e.g., between approximately 0.01 to 100 eV), in some embodiments neutron sensitive layer 232 may be made of materials which favor high energy neutrons (e.g., above about 2 MeV). Such a material may: 1) generate highly ionizing secondaries, such as alpha particles or beta rays when neutrons interact with these materials, 2) the induced neutron capture reactions may have very short half lives (e.g., about 800 ms or less), and 3) may need to have a well established neutron reaction onset energy threshold that falls within the neutron energy range of interest. One possible material may be $^{9}$Be. $^{9}$Be may have a threshold of approximately 2 MeV and may generate beta rays with a half-life of approximately 800 ms. The use of $^{9}$Be in neutron sensitive layer 102, instead of $^{10}$B or $^{6}$Li or similar type elements, may allow neutron detector 100 to be sensitive to high energy neutrons above an energy level of about 2 MeV.

Figure 3:
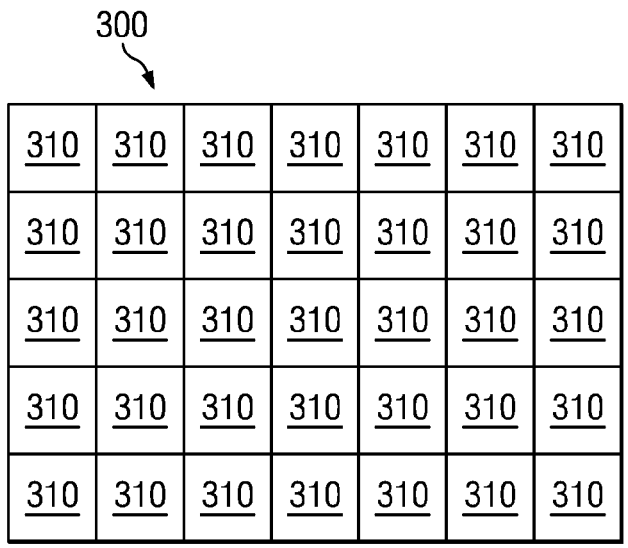
FIG. 3 is block diagram of the top view of a portion of an array of neutron detectors able to detect neutron radiation, in accordance with particular embodiments.

FIG. 3 is block diagram of the top view of a portion of an array of neutron detectors able to detect neutron radiation, in accordance with particular embodiments. Neutron detector array 300 includes an array of microbolometer detectors with a neutron stack disposed on each of the microbolometer detectors. Each neutron detector 310 may generate their own respective response values. These response values may be normalized and then averaged or averaged then normalized.

While the depicted portion includes a 5×7 array, certain embodiments may include arrays of approximately 640×480 neutron detectors 310. Other embodiments may include more or less than 640×480 neutron detectors 310 as needed. Each neutron detector 310 may be substantially square shaped with a center-to-center spacing of between approximately 17 and 50 µm.

In particular embodiments, neutron detector array 300 may include a mix of different types of neutron detectors 310. For example, neutron detector array 300 may comprise several neutron detectors 310 using $^{10}$B, $^{6}$Li or other similar type of neutron sensitive layers and several neutron detectors 310 using $^{9}$Be or other similar types of neutron sensitive layers. Such a design may provide neutron detector array 300 with the ability to detect both high and low energy neutrons, e.g., a rough cut of the energy spectrum above and below about 2 MeV.

Figure 4:
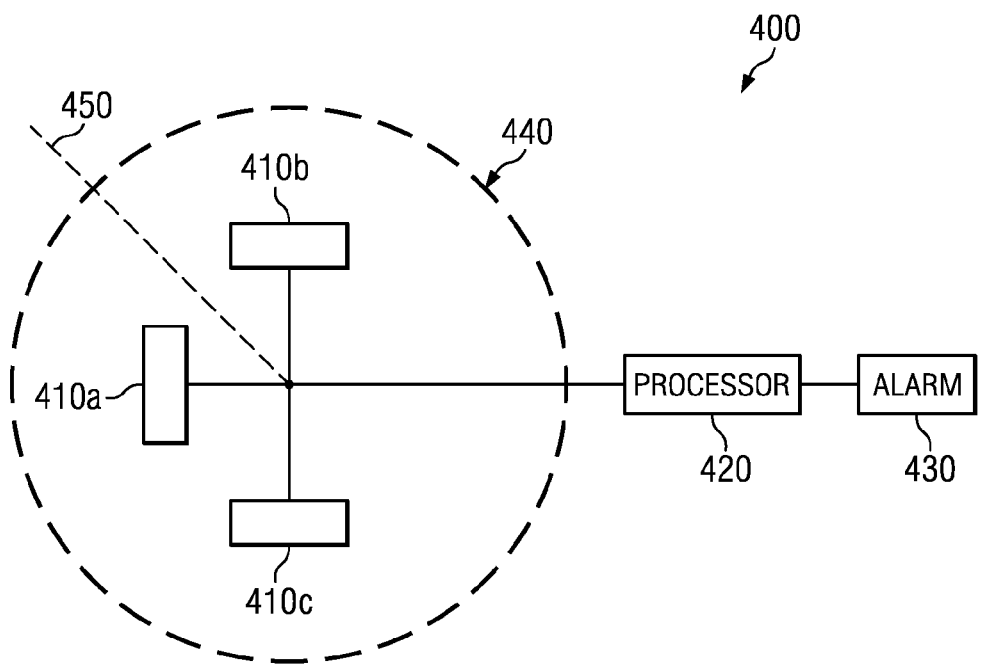
FIG. 4 is a block diagram of a system configured to detect neutron radiation, in accordance with particular embodiments.

FIG. 4 is a block diagram of a system configured to detect neutron radiation, in accordance with particular embodiments. Neutron detection system 400 includes neutron detector array 440, processor 420 and alarm 430.

Neutron detector array 440 comprises three different two-dimensional detector arrays (2D array 410a, 410b, and 410c). 2D arrays 410 are arranged such that each 2d array is aligned in a different direction. This may allow neutron detection system 400 to detect neutrons over a wide area and to better determine the direction from which the neutrons are being detected. In some embodiments, two or more 2D arrays may be arranged in series (e.g., arranged in a stack in which the 2D arrays face the same direction). This may increase the accuracy or sensitivity of the neutron detector array.

In some embodiments, neutron detector array 440 may be enclosed within an opaque box made of aluminum, or similar type material which has uniform temperature characteristics. The box may help reduce any spatial or temporal variations in the infrared flux experienced by neutron detector array 440. In some embodiments, the box may help block neutron radiation from reaching neutron detector array 440, processor 420, and/or alarm 430. In some embodiments, the box may be configured to only expose neutron detector array 440 to potential neutron radiation from specific directions or at specific times.

Each 2D array may be based on a two dimensional array of microbolometers. A sensing element within the microbolometer detectors may be responsive to the change in heat of a particle capture layer of a neutron stack. The neutron stack may include a heat barrier, a neutron sensitive layer, and a particle capture layer. The heat barrier may be configured to reflect at least a portion of incident radiant heat. This may help to reduce the impact of external sources (e.g., IR sourced heat) on the amount of heat within the neutron stack. The neutron sensitive layer may be configured to react with incident neutrons to form energetic particle pairs. The energetic particles of these energetic particle pairs may travel in random, but opposite directions. The particle capture layer may be configured to capture energetic particles formed by the neutron sensitive layer. The kinetic energy of these particles may be converted to heat by the capture layer.

The heat generated by the particle capture layer may be detected by the sensing element of the microbolometer. The resulting change in resistance of the sensing element may be used by a readout circuit to generate a response value. Each individual neutron detector within the respective 2D array 410 may generate its own signal. In some embodiments, the response values may be adjusted by a baseline value. The response values or adjusted response values may be sent to processor 420 to be used in determining if more than a first threshold amount of neutron radiation has been detected by one or more of 2D arrays 410.

Processor 420 may be a microprocessor, controller, or any other suitable computing device, resource, or combination of hardware, software and/or encoded logic operable to provide, either alone or in conjunction with other components, (e.g., memory) processing of the electrical signals received from neutron detector array 440. Such functionality may include generating an alarm signal that is sent to alarm 430. Additional examples and functionality provided, at least in part, by processor 420 are discussed herein. In some embodiments, processor 420 and/or alarm 430 may be shielded from neutron radiation.

In particular embodiments, processor 420 may include hardware for executing instructions, such as those making up a computer program. As an example, and not by way of limitation, to execute instructions, processor 420 may retrieve (or fetch) instructions from an internal register, an internal cache, memory, or any other suitable tangible computer readable storage media; decode and execute them; and then write one or more results to an internal register, an internal cache, memory, or any other suitable tangible computer readable storage media.

In particular embodiments, processor 420 may include one or more internal caches for data, instructions, or addresses. This disclosure contemplates processor 420 including any suitable number of any suitable internal caches, where appropriate. As an example and not by way of limitation, processor 420 may include one or more instruction caches, one or more data caches, and one or more translation lookaside buffers (TLBs). Instructions in the instruction caches may be copies of instructions in memory or another tangible computer readable storage media and the instruction caches may speed up retrieval of those instructions by processor 420. Data in the data caches may be copies of data in memory or another tangible computer readable storage media for instructions executing at processor 420 to operate on; the results of previous instructions executed at processor 420 for access by subsequent instructions executing at processor 420, or for writing to memory or another tangible computer readable storage media); or other suitable data. The data caches may speed up read or write operations by processor 420. The TLBs may speed up virtual-address translations for processor 420. In particular embodiments, processor 420 may include one or more internal registers for data, instructions, or addresses. Depending on the embodiment, processor 420 may include any suitable number of any suitable internal registers, where appropriate. Where appropriate, processor 420 may include one or more arithmetic logic units (ALUs); one or digital signal processing units; be a multi-core processor; include one or more processors 420; or any other suitable processor. Processor 420 may also comprise a Field Programmable Gate Array, an Application Specific Integrated Circuit, or any other digital processing device or circuit.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 420 (such as, for example, one or more internal registers or caches), or one or more portions of a separate memory component accessible by processor 420, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In certain embodiments, processor 420 may generate a comparison value based on the plurality of response values and a baseline response value. For example, processor 420 may determine the comparison value by subtracting the baseline response value from the response values from the readout circuits of neutron detector array 440. In some embodiments, the comparison value may be determined by first averaging the response values from each neutron detector of each 2D array. The average response values may be determined by the readout circuits, the readout circuits and processor 420, or by processor 420 alone (e.g., the readout circuits send processor 420 the response value from each neutron detector). The resulting average response values may then be compared to the baseline response value. In some embodiments, each response value may be adjusted by the baseline response value. The adjusted response values may then be averaged to generate the comparison value.

The baseline value may be based on an average or normal response value from a neutron detector. For example, in some embodiments the baseline value may be a dynamic value that is based on previously generated response values. As another example, the baseline value may be determined from one or more reference measurements taken from one or more reference microbolometers. Each reference microbolometer may be similar to a neutron detector (such as neutron detector 200) only without a neutron sensitive layer (e.g., neutron sensitive layer 232). The lack of a neutron sensitive layer may allow the reference microbolometers to experience and respond to the same ambient temperature and/or environmental conditions. Either example may allow for neutron detector 400 to self calibrate itself, for example, as ambient temperatures change (e.g., outdoors) or when being used in environments with abnormally high or low neutron levels. In some embodiments, the baseline value may be a predetermined value. This may be done in situations in which neutron detection system 400 will be used in temperature controlled environments. In some embodiments, a user may be able to adjust the baseline value.

Processor 420 may use the comparison value to determine whether more than a first threshold amount of neutron radiation is being generated (e.g., delectated by one or more of 2D arrays 410. In the depicted embodiment, processor 420 may maintain three separate comparison values, one for each of 2D arrays 410. This may allow processor 420 to identify which of 2D arrays 410 detected the high levels of neutron radiation. By identifying which of 2D arrays 410 detected more than the threshold amount of neutron radiation, processor 420 may be able to determine the direction in which the source of the neutron radiation is located. The precision of the directional determination may be increased by increasing the number of 2D arrays used, or by looking at the relative amounts of the respective comparison values. For example, if both 2D arrays 410a and 410b detected a similar amount of neutron radiation above the threshold amount, processor 420 may determine that the source of the neutron radiation is somewhere along line 450 between 2D arrays 410a and 410b.

Processor 420 may use the comparison value to generate an alarm signal that is sent to alarm 430. The alarm signal may comprise an indication that more than a threshold amount of neutron radiation has been detected, the relative magnitude of how much more than the threshold amount neutron radiation has been detected, the general direction from which the neutron radiation was detected, or some combination of the above.

Alarm 430 may comprise an audible and/or a visual alarm. For example, alarm 430 may include a speaker for generating an alert tone or beep. In some embodiments, alarm 430 may beep faster or louder the farther the detected neutron radiation is above the threshold. As another example, alarm 430 may comprise one or more lights. In some embodiments, the lights may change color (e.g., from green to yellow to red) or the number of lights that are illuminated may increase the farther the detected neutron radiation is above the threshold. In some embodiments, the lights may be arranged to provide a user with directional information. In some embodiments, alarm 430 may comprise a graphical alarm which may communicate the severity of the amount of neutron radiation that has been detected as well as the direction of the source of the neutron radiation.

Figure 5:
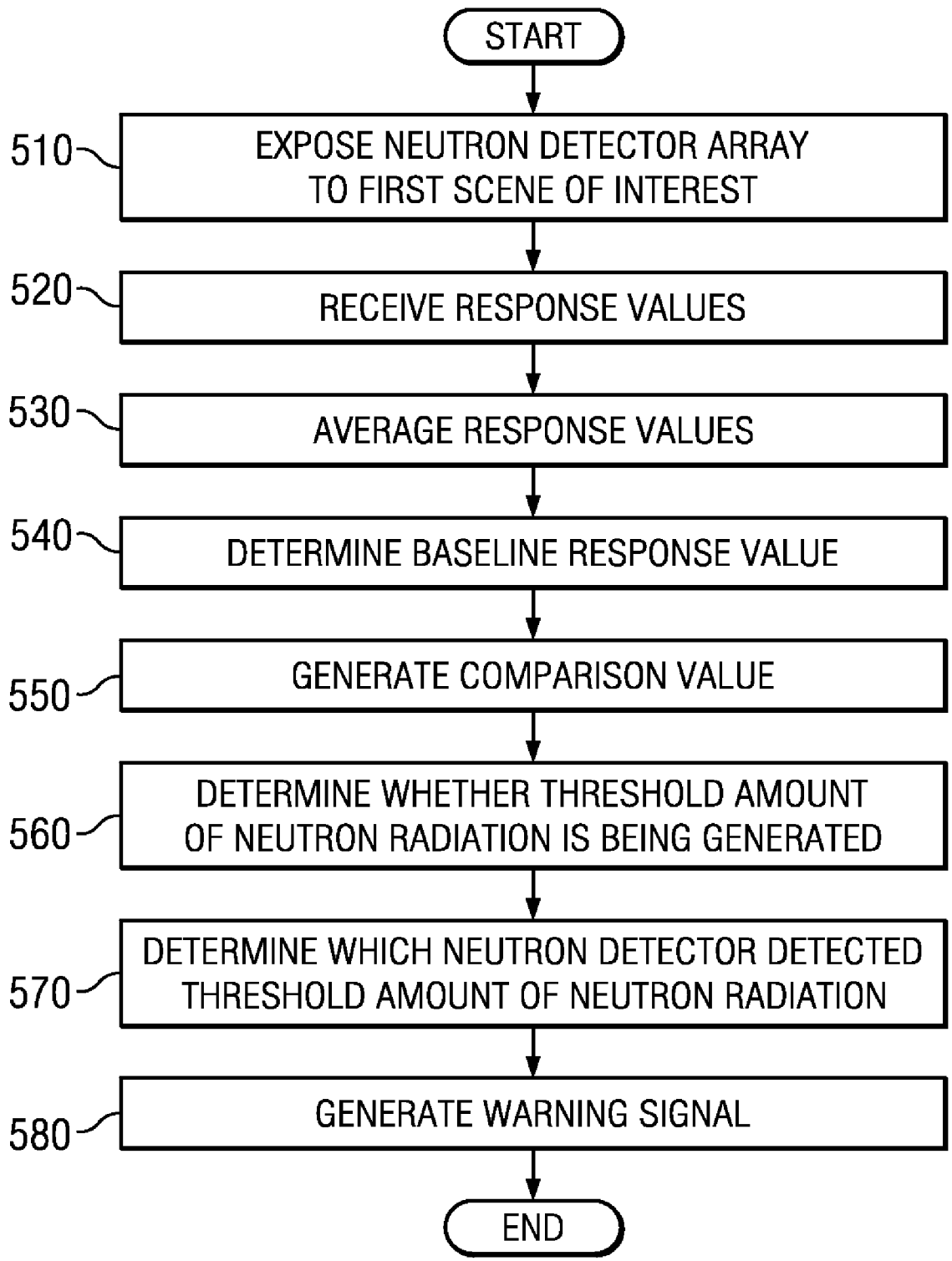
FIG. 5 is a flowchart depicting a method for detecting neutron radiation, in accordance with particular embodiments.

FIG. 5 is a flowchart depicting a method for detecting neutron radiation, in accordance with particular embodiments. The method begins at step 510 by exposing a neutron detector array to a first scene of interest. The first scene of interest may be any of a variety of different types of scenes. For example, the first scene of interest may comprise a relatively small area associated with a security checkpoint. In a particular instance of this example, the neutron detector array may be elevated and directed down to an area through people or vehicles pass. As another example, the first scene of interest may comprise a relatively large area. In a particular instance of this example, the neutron detector array may be used to detect if and where neutrons are being radiated around a user.

In some embodiments, exposing the neutron detector array may comprise opening or raising a shutter configured to block neutrons. In certain embodiments, exposing the neutron detector array may comprise changing the orientation of the neutron detector array. For example, the neutron detector array may be coupled to a rotating device configured to make 360 degree sweeps.

As discussed above, the neutron detector array may be made of any number of two-dimensional arrays of neutron detectors. The two-dimensional arrays may be arranged in any desirable or suitable configuration. Each of the two-dimensional arrays of neutron detectors may be based on a two-dimensional array of microbolometer detectors. For example, the heat sensitive sensing element of a microbolometer may be coupled to a neutron stack that generates heat as it captures neutrons. The neutron stack may include a heat barrier that reflects at least a portion of incident radiant heat. The heat barrier may be positioned between the first scene of interest and a neutron sensitive layer. The neutron sensitive layer may be made of a material that reacts with incident neutrons. The reaction may generate energetic particles, a portion of which may be captured by a particle capture layer. The particle capture layer may capture some of the energetic particles. In doing so, the kinetic energy of the energetic particles may be converted to heat. This change in heat is then detected by the sensing element of the microbolometer detector.

At step 520, the response values from the neutron detectors are received. The response values may be based on the change in resistance of the sensing elements due to the change in heat of the particle capture layer. The change in resistance may be received as a signal from a readout circuit. The signal may be based on the amount or number of neutrons captured by the neutron sensitive layer.

At step 530, the response values from the plurality of neutron detectors are averaged. For example, in some embodiments, each two-dimensional array may determine and send the average response for its own respective neutron detectors. As another example, in some embodiments the readout circuits may simply send the response values from their own respective neutron detectors to another component (e.g., a processor) of the neutron detection system to be averaged. In certain embodiments, the neutron detection system may not be interested in what the neutron source looks like. This may allow the neutron detection system to ignore or discard information associated with identifying the particular neutron detectors of the two-dimensional array of neutron detectors because the neutron detection system is not attempting to create an image of the source of the neutron radiation.

At step 540 a baseline response value is determined. The baseline response value may be a dynamic or predetermined value. The baseline response value may be used to help identify larger than normal changes in temperature due to detected neutrons. In some embodiments, the baseline response value may be determined by retrieving a predetermined baseline response value from memory. In particular embodiments, the baseline response value may be determined from previous response values. For example, the baseline response value may be based on an average of a predetermined number of previous response values.

At step 550 a comparison value is generated. The comparison value may be indicative of the difference between the average response value and the baseline response value. In some embodiments, the bigger the comparison value is, the greater the difference is between the response value and the baseline response value. The greater the comparison value, the more neutron radiation is being detected.

At step 560 it is determined whether a threshold amount of neutron radiation has been detected. This may be based on whether the comparison value is greater than a threshold value. Depending on the embodiment, the threshold value may be fixed or adjustable. For example, in some scenarios, the neutron detection system may be used in an environment in which the neutron detection system is attempting to identify a source of neutron radiation in an environment in which there is an elevated level neutron radiation. In such an environment, a user may raise the threshold level to reduce the sensitivity of the neutron detection system. This may reduce the frequency of false alarms.

At step 570, the two-dimensional array of neutron detectors that detected the threshold amount of neutron radiation is determined. There may be more than one two-dimensional array of neutron detectors that detected the threshold amount of neutron radiation. At step 580 a warning signal is generated. The warning signal may comprise an audible or visual alert. In some embodiments, the warning signal may indicate which direction the source of the neutron radiation is located based on the determination as to which of the two-dimensional arrays of neutron detectors detected the neutron radiation.

One or more of the steps illustrated in FIG. 3 may be combined, modified, rearranged, or deleted where appropriate, and additional steps may also be added to the flowchart. For example, in some embodiments steps 530 and 540 maybe reversed. In such an embodiment the neutron detection system may first determine a baseline response value. The baseline response value may then be used to adjust each response value by the baseline response value. The adjusted response values may then be averaged.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2, according to operational needs or desires. Furthermore, the elements of the various neutron detectors may be combined, rearranged or positioned in order to accommodate particular detecting needs. In addition, any of these elements may be provided as separate external components to a neutron detector or each other where appropriate. Particular embodiments contemplate great flexibility in the arrangement of these elements as well as their internal components.

Although particular embodiments have been described in detail, it should be understood that various other changes, substitutions, and alterations may be made hereto without departing from the spirit and scope of particular embodiments. For example, although an embodiment has been described based on reaction (1), an alternative reaction is $^6Li(n,\alpha)^3H$. In this alternate reaction the neutron is absorbed by a 6Li nucleus releasing an alpha particle at about 2.05 MeV and a 3H nucleus at about 2.73 MeV. Similar as discussed above, energetic particles emerge in opposite directions with random orientation. In this reaction, Q is equal to about 4.78 MeV. The natural isotopic abundance of 6Li is about 7.42%.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. A system for detecting neutron radiation, comprising:
a neutron detector array comprising:
  a two-dimensional array of microbolometer detectors comprising sensing elements responsive to heat;
  a plurality of particle capture layers, each particle capture layer coupled to a different microbolometer detector of the two-dimensional array of microbolometer detectors, each particle capture layer configured to capture energetic particles and convert kinetic energy from the energetic particles to heat;
  a plurality of neutron sensitive layers, each neutron sensitive layer coupled to a different particle capture layer and configured to react with incident neutrons to form energetic particles; and
  a plurality of heat barriers, each heat barrier coupled to a different neutron sensitive layer and configured to reflect at least a portion of incident radiant heat;
a readout circuit coupled to the neutron detector array, the readout circuit configured to generate a plurality of response values from the two-dimensional array of microbolometer detectors; and
a processor coupled to the readout circuit, the processor configured to:
  generate a comparison value based on the plurality of response values and a baseline response value; and
  determine whether more than a first threshold amount of neutron radiation has been detected by the neutron detector array.

2. A method for detecting neutron radiation, comprising:
exposing a neutron detector array comprising at least one two-dimensional array of neutron detectors to a first scene of interest, the neutron detector array based on at least one two-dimensional array of microbolometer detectors;
receiving a plurality of response values from a corresponding plurality of neutron detectors of the neutron detector array;

generating a comparison value based on the plurality of response values and a baseline response value; and
determining whether more than a first threshold amount of neutron radiation is being generated by the first scene based on the comparison value.

3. The method of claim 2, wherein generating a comparison value based on the plurality of response values and a baseline response value comprises:
averaging the plurality of response values from the plurality of neutron detectors; and
comparing the average response to the baseline response value.

4. The method of claim 2, wherein generating a comparison value based on the plurality of response values and a baseline response value comprises:
adjusting each response value by a baseline response value;
generating a plurality of adjusted response values based on the adjustment to each response value;
averaging the adjusted response values; and
comparing the average response to a threshold response value.

5. The method of claim 2, further comprising determining the baseline response value from one or more previously received response values from a corresponding plurality of neutron detectors of the neutron detector array.

6. The method of claim 2, further comprising determining the baseline response value from one or more response values from one or more reference microbolometer detectors, the one or more reference microbolometers part of the at least one two-dimensional array of microbolometer detectors.

7. The method of claim 2, wherein exposing a neutron detector array comprising a two-dimensional array of neutron detectors to a first scene of interest comprises exposing the neutron detector array comprising a two-dimensional array of neutron detectors to a first scene of interest, each neutron detector comprising:
a heat barrier configured to reflect at least a portion of incident radiant heat;
a neutron sensitive layer configured to react with incident neutrons to form energetic particles;
a particle capture layer configured to capture energetic particles and convert kinetic energy from the energetic particles to heat; and
a microbolometer sensing element responsive to the heat.

8. The method of claim 2, further comprising, upon determining that more than the first threshold amount of neutron radiation is being generated by the first scene, generating a warning signal indicating that more than the first threshold amount of neutron radiation has been detected.

9. The method of claim 2:
wherein exposing a neutron detector array to a first scene of interest comprises exposing a neutron detector array comprising two or more two-dimensional arrays of neutron detectors to a first scene of interest; and
further comprising, upon determining that more than the first threshold amount of neutron radiation is being generated by the first scene:
determining which two-dimensional array of neutron detectors provided the comparison value indicating that more than the first threshold amount of neutron radiation is being generated by the first scene; and
generating a warning signal indicating that more than the first threshold amount of neutron radiation has been detected and indicating which two-dimensional array of neutron detectors detected the more than the first threshold amount of neutron radiation.

10. A system for detecting neutron radiation, comprising:
a neutron detector array comprising at least one two-dimensional array of neutron detectors based on at least one two-dimensional array of microbolometer detectors, the neutron detector array configured to be exposed to a first scene;
a readout circuit coupled to the neutron detector array, the readout circuit configured to generate a plurality of response values from a corresponding plurality of neutron detectors of the neutron detector array; and
a processor coupled to the readout circuit, the processor configured to:
generate a comparison value based on the plurality of response values and a baseline response value; and
determine whether more than a first threshold amount of neutron radiation is being generated by the first scene based on the comparison value.

11. The system of claim 10, wherein each neutron detector of the two-dimensional array of neutron detectors comprises:
a heat barrier configured to reflect at least a portion of incident radiant heat;
a neutron sensitive layer configured to react with incident neutrons to form energetic particles;
a particle capture layer configured to capture energetic particles and convert kinetic energy from the energetic particles to heat; and
a microbolometer sensing element responsive to the heat.

12. The system of claim 10, wherein the neutron detector array comprises two or more two-dimensional arrays of neutron detectors, each of the two or more two-dimensional arrays aligned in a different direction.

13. The system of claim 12, wherein the processor is further configured to:
determine a direction the more than a first threshold amount of neutron radiation is being generated; and
generate a warning signal indicating the direction from which the more than a first threshold amount neutron radiation is being generated.

14. The system of claim 10, wherein the neutron detector array comprises two or more two-dimensional arrays of neutron detectors, each of the two or more two-dimensional arrays arranged in a stack aligned in a same direction.

15. The system of claim 10, wherein the processor is further configured to:
average the plurality of response values from the readout circuit; and
compare the average response to the baseline response value.

16. The system of claim 10, wherein the processor is further configured to:
adjust each response value by a baseline response value;
generate a plurality of adjusted response values based on the adjustment to each response value;
average the adjusted response values; and
compare the average response to a threshold response value.

17. One or more computer-readable non-transitory storage media embodying software that when executed by a processor is configured to:
expose a neutron detector array comprising at least one two-dimensional array of neutron detectors to a first scene of interest, the neutron detector array based on at least one two-dimensional array of microbolometer detectors;
receive a plurality of response values from a corresponding plurality of neutron detectors of the neutron detector array;

generate a comparison value based on the plurality of response values and a baseline response value; and determine whether more than a first threshold amount of neutron radiation is being generated by the first scene based on the comparison value.

18. The media of claim 17, wherein the software configured to generate a comparison value based on the plurality of response values and a baseline response value is further configured to:

average the plurality of response values from the plurality of neutron detectors; and compare the average response to the baseline response value.

19. The media of claim 17, wherein the software configured to generate a comparison value based on the plurality of response values and a baseline response value is further configured to:

adjust each response value by a baseline response value;

generate a plurality of adjusted response values based on the adjustment to each response value;

average the adjusted response values; and compare the average response to a threshold response value.

20. The media of claim 17, wherein the software is further configured to determine the baseline response value from one or more previously received response values from a corresponding plurality of neutron detectors of the neutron detector array.

21. The media of claim 17, wherein the software configured to expose a neutron detector array comprising a two-dimensional array of neutron detectors to a first scene of interest is further configured to expose the neutron detector array comprising a two-dimensional array of neutron detectors to a first scene of interest, each neutron detector comprising:

a heat barrier configured to reflect at least a portion of incident radiant heat;

a neutron sensitive layer configured to react with incident neutrons to form energetic particles;

a particle capture layer configured to capture energetic particles and convert kinetic energy from the energetic particles to heat; and a microbolometer sensing element responsive to the heat.

22. The media of claim 17, wherein the software is further configured to, upon determining that more than the first threshold amount of neutron radiation is being generated by the first scene, generate a warning signal indicating that more than the first threshold amount of neutron radiation has been detected.

* * * * *